United States Patent [19]
Young

[11] Patent Number: 5,521,603
[45] Date of Patent: May 28, 1996

[54] INCIPIENT LIGHTNING DETECTION AND DEVICE PROTECTION

[75] Inventor: Danny J. Young, Orlando, Fla.

[73] Assignee: Rabun Labs, Inc., Plant City, Fla.

[21] Appl. No.: 162,941

[22] Filed: Dec. 8, 1993

Related U.S. Application Data

[63] Continuation-in-part of Ser. No. 876,332, Apr. 30, 1992, Pat. No. 5,291,208.

[51] Int. Cl.$^6$ ................................................. G01S 7/285
[52] U.S. Cl. .......................................................... 342/198
[58] Field of Search ........................ 342/198; 73/170.24; 364/483; 340/601; 361/1, 111, 117

[56] References Cited

U.S. PATENT DOCUMENTS

| | | | |
|---|---|---|---|
| 2,265,868 | 12/1941 | Schonland | 361/120 X |
| 3,215,997 | 11/1965 | Leavitt et al. | 340/253 |
| 3,334,298 | 8/1967 | Krohn | 324/77 A |
| 3,584,260 | 6/1971 | Barbini | 317/61 |
| 3,603,951 | 9/1971 | Bracken | 73/170 R |
| 3,715,660 | 2/1973 | Ruhnke | 324/72 |
| 3,753,117 | 8/1973 | Downing et al. | 325/364 |
| 3,790,884 | 2/1974 | Kohl | 324/72 |
| 3,891,919 | 6/1975 | Penninger | 324/72 |
| 3,965,395 | 6/1976 | Young | 317/18 R |
| 4,023,408 | 5/1977 | Ryan | 324/72 |
| 4,095,221 | 6/1978 | Slocum, Jr. | 340/421 |
| 4,115,732 | 9/1978 | Krider et al. | 324/72 |
| 4,198,599 | 4/1980 | Krider et al. | 324/72 |
| 4,272,720 | 6/1981 | Lennon | 324/72 |
| 4,276,576 | 6/1981 | Uman et al. | 361/1 |
| 4,543,580 | 9/1985 | Bent et al. | 343/460 |
| 4,792,806 | 12/1988 | Bent et al. | 342/465 |
| 4,803,421 | 2/1989 | Ostrander | 324/72 |
| 4,806,851 | 2/1989 | Krider et al. | 324/72 |
| 4,996,473 | 2/1991 | Markson et al. | 324/72 |
| 5,168,212 | 12/1992 | Byerley, III et al. | 324/72 |
| 5,263,368 | 11/1993 | Breitmeier et al. | 73/170.24 |
| 5,291,208 | 3/1994 | Young | 342/198 |
| 5,315,533 | 5/1994 | Stich et al. | 364/483 |

OTHER PUBLICATIONS

Stark, "Simple Lightning Detector", *Amateur Radio Magazine*, Apr. 1973, p. 85.
Back, "Lightning and Thunder and Other Stuff", *Amateur Radio Magazine*, Jul. 1976, pp. 65–68.
Graf, Rudolf F., *The Encyclopedia of Electronic Circuits*, ISBN 0–8306–0938–5, TAB Books, Fig. 76–3 (p. 580) and Fig. 76–5 (p. 581).
Graf, Rudolf F., *Encyclopedia of Electronic Circuits*, ISBN 0–8306–3896–2, TAB Books, Fig. 56–6–reprinted–Popular Electronics Aug. 1991 (pp. 35–36).

*Primary Examiner*—Daniel T. Pihulic
*Attorney, Agent, or Firm*—Allen, Dyer, Doppelt, Franjola & Milbrath

[57] ABSTRACT

An apparatus and method are provided for continuously and automatically protecting an electrical device (22) from a potential threat of damaging voltage levels. The apparatus includes a detector (24) for the threat and a protection switching circuit (30) for grounding the electrical device and the detector upon detection. Grounding occurs for a predetermined time interval, after which the detector is again automatically re-activated. Embodiments of detectors include detectors which detect the degree of electrical changes in a surrounding field and detectors comprising a tuned radio receiver. One embodiment includes a device utilization monitor (222) and a detector disable circuit (224) for disabling the detector, and thereby precluding grounding, while a device such as a radio frequency transmitter is being utilized.

21 Claims, 6 Drawing Sheets

# INCIPIENT LIGHTNING DETECTION AND DEVICE PROTECTION

This is a continuation-in-part patent application of U.S. Pat. application Ser. No. 07/876,332 filed Apr. 30, 1992, now U.S. Pat. No. 5,291,208.

BACKGROUND

1. Field of Invention

This invention pertains to the protection of electrically operated devices from damaging voltage levels, particularly high voltage levels attending atmospheric disturbances such as lightning.

2. Prior Art and Other Considerations

Prudent practice suggests that electrical and electronic devices should be protected from high voltage levels lest the devices sustain inordinate if not irreparable damage. Electrical disturbances in the atmosphere have long posed perilous problems to electrical devices, and are nowadays particularly troublesome for communications and computer devices.

The conventional approach for protecting electrical devices from damaging voltage levels involves utilization of passive protection devices. These passive protection devices cause disconnection of the protected devices after high voltage levels or spikes are actually detected, i.e., after a storm has already reached a magnitude that can damage or destroy electrical devices. Numerous passive protectors have been employed, including metal oxide varistors, thyrectors, gas discharge tubes, and ground rods. Lacking in the prior art is a protection system that protects electrical equipment before a storm reaches a perilous magnitude.

The passive protection devices described above disconnect the protected device and keep the protected device disconnected until a human intervenes to re-connect the protected device. Sustained disconnection in this manner occasions unnecessary down time for devices which otherwise might profitably be communicating with the outside world after the threat of damaging voltage levels has subsided.

Passive protection devices cannot ascertain when, despite the threat of damaging voltage levels, the continued use of the protected device should nevertheless be accommodated. Such discretion would be particularly advantageous, for example, in the field of radio communications wherein an opportunity should be provided to continue transmissions in progress at the time of detection of the potential threat of high voltage levels.

Accordingly, it is an object of the present invention to provide method and apparatus for protecting an electrical device from a potential threat of damaging voltage levels.

An advantage of the present invention is the provision of method and apparatus which selectively disconnects and re-connects a protected a device in accordance with a sensed potential of damaging voltage levels.

A further advantage of the present invention is the provision of method and apparatus which protects an electrical device from a potential of damaging voltage levels but which also accommodates continued utilization of the device under desirable conditions.

SUMMARY

An apparatus and method are provided for continuously and automatically protecting an electrical device from a threat of potentially damaging voltage levels. The apparatus includes a detector for detecting the threat and a protection switching circuit for grounding the electrical device and the detector upon detection. Grounding occurs for a predetermined time interval, after which the detector is again automatically re-activated. Embodiments of detectors include detectors which detect the degree of electrical changes in a surrounding field and detectors comprising a tuned radio receiver. One embodiment includes a device utilization monitor and a detector disable circuit for disabling the detector, and thereby precluding grounding, while a device such as a radio frequency transmitter is being utilized.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is schematic view of a protection system according to another embodiment of the invention.

DETAILED DESCRIPTION OF THE DRAWINGS

Figure 1:
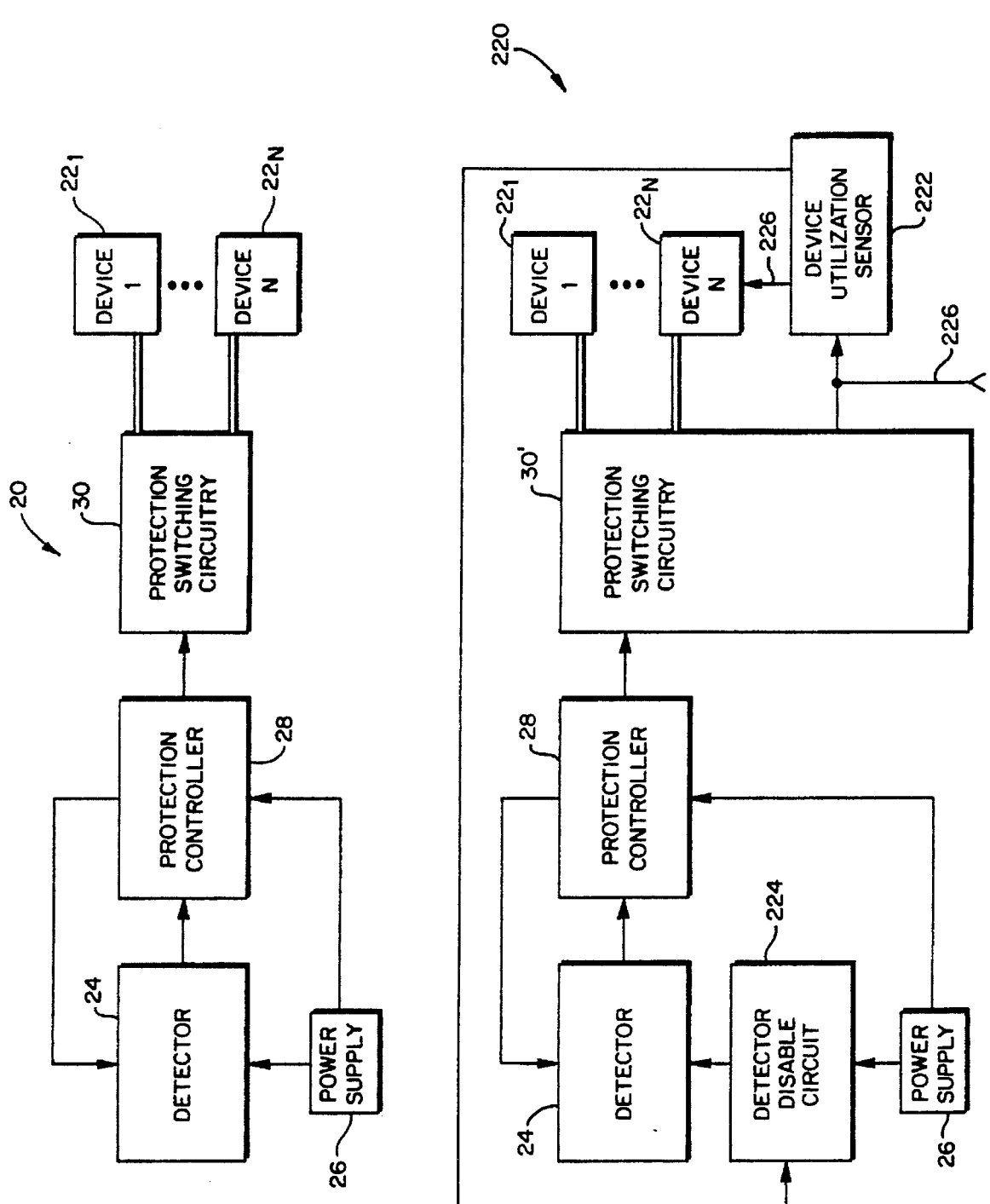
FIG. 1 is schematic view of a protection system according to an embodiment of the invention.

FIG. 1 shows a protection system 20 for protecting one or more electrical devices (such as devices $22_1$–$22_N$) from a potential threat of damaging voltage levels occurring by reason of electrical disturbances in the atmosphere. The protection system 20 of the embodiment of FIG. 1 comprises a detector 24; a power supply 26; and, electrical grounding means including a protection controller 28 and protection switching circuitry 30. When the detector 24 senses a potential threat of damaging voltage condition occasioned by electrical disturbances in the atmosphere, the protection controller 28 directs the protection switching circuitry 30 to ground or otherwise protect the devices 22.

Figure 2:
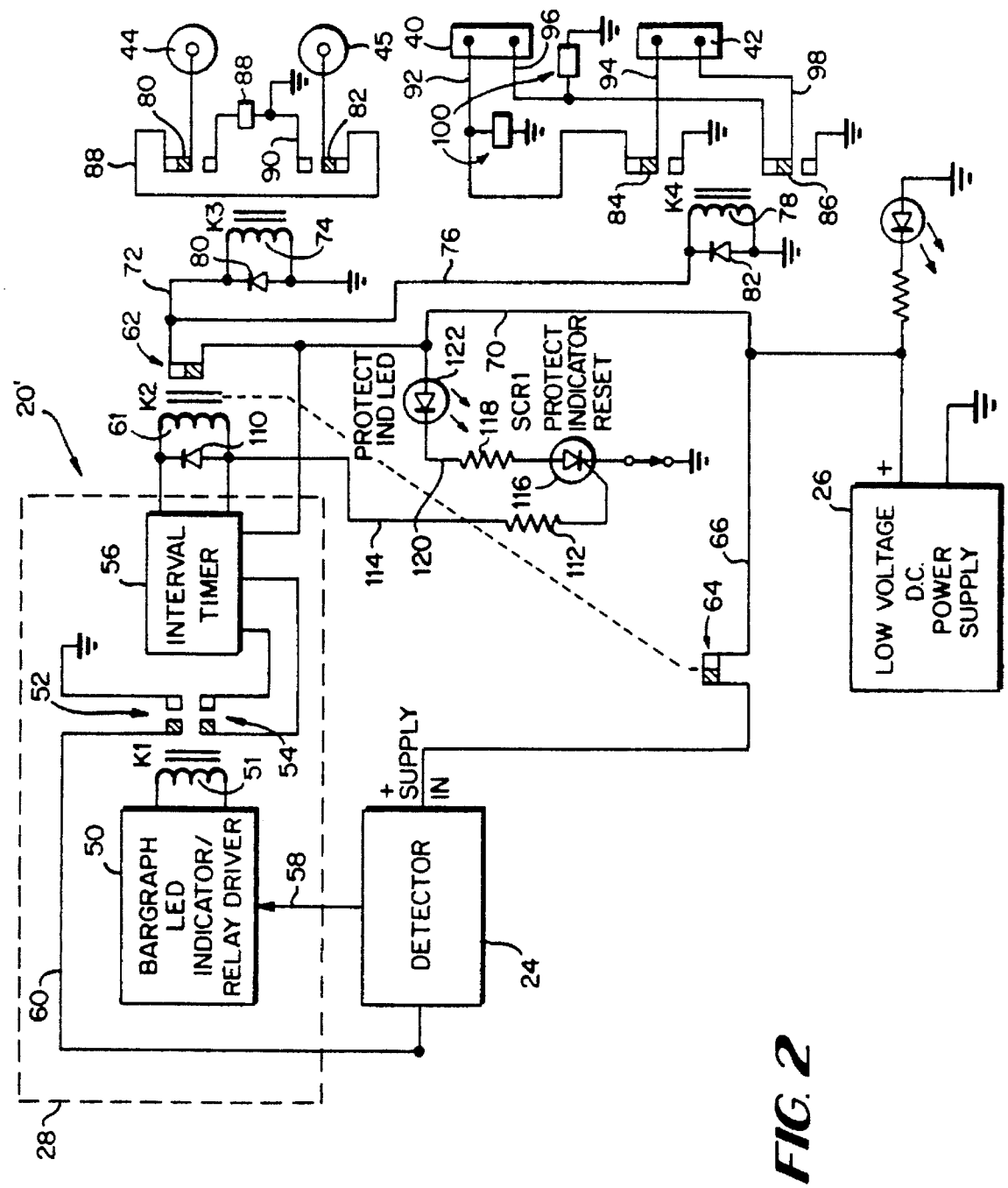
FIG. 2 is a detailed schematic view of an exemplary protection system of the embodiment of FIG. 1.

FIG. 2 shows an example of the protection system 20' of the embodiment of FIG. 1. The protection system 20' is shown as protecting a telephone line-utilizing device and an antenna-utilizing device. In this respect, for the telephone-line utilizing device FIG. 2 shows a telephone input line connector 40 and an output connector 42 to a device such as a modem, computer, or phone patch. Further, for the antenna-utilizing device FIG. 2 shows coax connectors 44 and 45, with coax connector 44 being connected to an antenna and coax connector 45 being connected to an antenna input terminal of the antenna-utilizing equipment.

As seen in FIG. 2, the protection controller 28 includes a bargraph LED indicator/relay driver circuit 50; a switch relay K1 including coil 51 and relay contacts 52 and 54; and, an interval timer 56. As described below, the indicator/driver circuit 50 (shown in detail in FIG. 3) activates (i.e., energizes) coil 51 of the switch relay K1 when a detection signal on line 58 from the detector 24 exceeds a predetermined threshold.

The switch contacts 52 are closable in response to activation of relay K1 for applying a grounding signal to the detector 24 on a line 60, as discussed in more detail below. Switch contacts 54 are closable in response to activation of the relay K1 for starting the interval timer 56. As illustrated in the accompanying drawings for all switch contacts described herein, the particular contact which is movable upon activation or de-activation of the coil is shown as darkened. Moreover, the position of the contacts shown in the accompanying drawings are those during normal operation (when potentially threatening high voltage is not detected).

When started, the interval timer 56 remains on for a predetermined time interval and activates a coil 61 of a master protection relay K2 of the protection switching circuit 30 during the predetermined time interval.

Responsive to the master protection relay K2 are switch contacts 62 and 64. Switch contacts 62 open upon activation of the coil 61 of relay K2 for controlling, in the manner hereinafter described, slave relays K3 and K4 included in the protection switching circuit 30. Switch contacts 64, provided on line 66 intermediate the detector 24 and the power supply 26, open upon activation of the coil 61 of the relay K2 for turning off power to the detector 24.

Continuing with the description of the protection switching circuit 30, a first of the switch contacts 62 is connected via line 70 to the power supply 26. A second of the switch contacts 62 is connected by line 72 to a first end of a coil 74 of the slave relay K3 and by line 76 to a first end of a coil 78 of the slave relay K4. Second ends of the coils 74, 78 of the slave relays K3, K4 are connected to ground. Blocking diodes 80, 82 are connected between the first and second ends of the coils 74, 78, respectively.

Two pairs of relay contacts are responsive to the actuation of each of the slave relays K3 and K4. In particular, contacts 80 and 82 are responsive to slave relay K3 and contacts 84 and 86 are responsive to slave relay K4.

Considering now the antenna-utilizing device connected by coax connector 45, under normal voltage conditions the coax connector 44 leading to the antenna is connected through contact 80, through a line 88, and through contact 82 to the coax connector 45. As mentioned before, the coax connector 45 is connected via an unillustrated coaxial cable to an antenna input terminal of the antenna-utilizing device. However, when a potential threat of overvoltage conditions prompts the protection controller 28 to activate the relay K2, and thereby de-energize relay K3, the contacts 80 and 82 switch so that the coax connectors 44 and 45 (and thus the antenna and the antenna-utilizing device) are connected to a discharge device 88 provided on line 90.

Similarly considering the telephone line-utilizing device connected to the connector 42, under normal voltage conditions a first input telephone wire 92 from input connector 40 is connected through contact 84 with a corresponding output telephone wire 94 leading to output connector 42. Likewise a second input telephone wire 96 from input connector 40 is connected through contact 86 with a corresponding output telephone wire 98 leading to output connector 42. Each of the input telephone wires 92 and 96 have line protection devices 100 installed thereon. However, when a potential threat of overvoltage condition prompts the protection controller 28 to activate relays K2 and K4, the contacts 84 and 86 switch so that the output telephone wires 94 leading to output connector 42 are grounded.

The coil 61 of the master relay K2 has a diode 110 connected between its first and second ends. A second end of the coil 61 of the master relay K2 is connected via resistor 112 on line 114 to a silicon controlled rectifier (SCR1) 116, which in turn is connected through resistor 118 on line 120 to an LED 122, the LED 122 also being connected via line 70 to the power supply 26. When the master relay K2 is activated, the SCR1 116 triggers, thereby illuminating LED 122 to provide an indication that the protection system 20' has been invoked to protect the electrical devices when a potential threat of a dangerous overvoltage condition is sensed.

Figure 4:
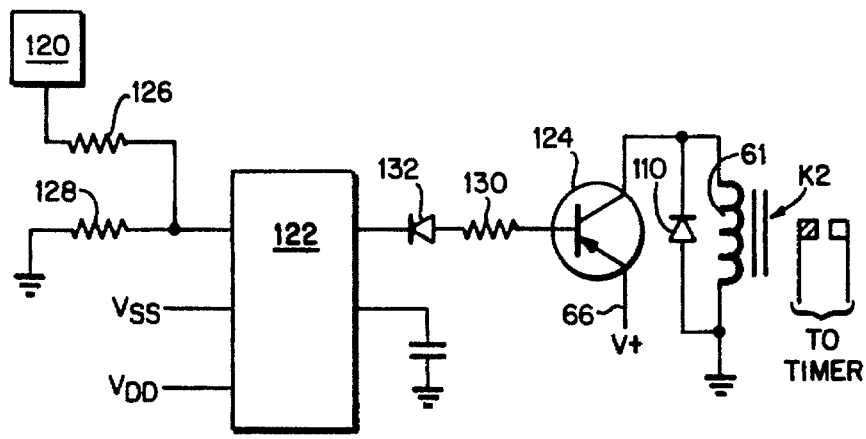
FIGS. 4, 5, and 6 are schematic views of detectors suitable for use with the embodiments of the invention.

FIG. 4 shows a detector suitable for use as the detector 24 of the protection systems described herein. The detector of FIG. 4 includes an atmospheric charge sensor 120; a detector circuit 122; and, a driving transistor 124. The detector circuit 122 is a Holt Integrated circuit having part number HI-1220, or an equivalent thereof. An input terminal of the detector circuit 122 is connected on a voltage divider network between resistors 126 and 128. The resistor 126 is in turn connected to the charge sensor 120 and the resistor 128 is in turn connected to ground.

The gate of the transistor driver 124 is connected through resistor 130 and diode 132 to the output terminal of the detector circuit 122. The emitter of transistor driver 124 is connected to the power supply 26. The collector of the transistor driver 124 is connected to coil 61 of the relay K2.

Figure 5:
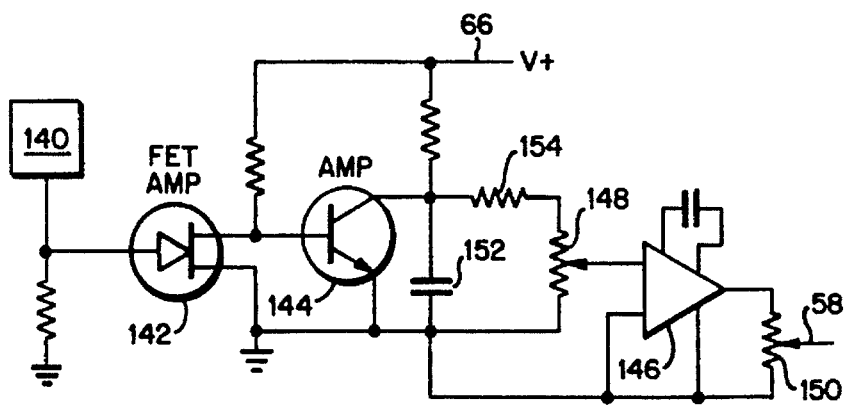

FIG. 5 shows another detector suitable for use as the detector 24 of the protection systems described herein. The detector of FIG. 5 includes an atmospheric charge sensor 140; an FET pre-amplifier 142; a transistor amplifier 144; a power driver 146 (LM 386); and, potentiometers 148 and 150. The charge sensor 140 is connected both to ground and to the gate of the FET pre-amplifier 142. One leg of the FET pre-amplifier 142 is tied to ground, the other leg is applied to the gate of the transistor amplifier 144. The emitter of the amplifier 144 is connected to ground while the collector is connected as shown in FIG. 5 to a parallel network having capacitor 152 in one leg thereof and resistor 154 in series with potentiometer 148 in a second leg thereof. A tap of the potentiometer 148 is connected to an input terminal of the power driver 146. The output of the power driver 146 is connected to the potentiometer 150. A signal from the tap of the potentiometer 150 is applied to the protection controller 28 on line 58. Although not shown as such, it should be understood that the power driver 146 operates on voltage from the power supply 26.

The atmospheric charge sensors 120 and 140 of the embodiments of FIGS. 4 and 5 can be a metallic plate, a metal rod, or antenna (such as a telescoping antenna). In one embodiment, the atmospheric charge sensor 120 is a metal aluminum plate measuring 4 inches by six inches by 1/16 inch in thickness. A change in atmospheric charge due to ion changes from an approaching storm will change the capacitance in the field around the sensor 120 so that it will trigger the detector circuit.

Figure 6:
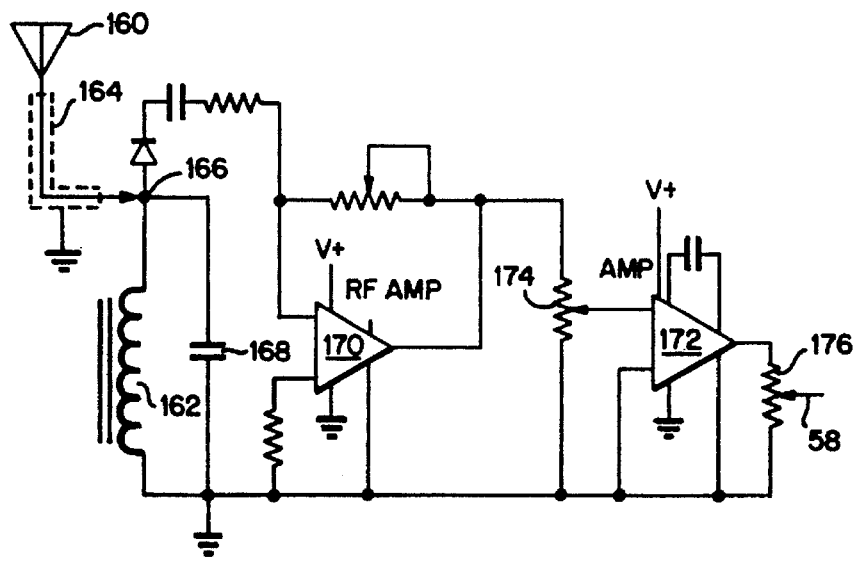

FIG. 6 shows yet another detector suitable for use as the detector 24 of the protection systems described herein. The detector of FIG. 6 utilizes a tuned radio receiver. The detector of FIG. 6 comprises either an external antenna 160 and an RF choke or a ferrite coil antenna 162 (both types of antennae being shown in FIG. 6, it being understood that when using an external antenna 160 the RF choke would be in the location of the ferrite coil antenna 162). The external antenna 160 is connected by a shielded line 164 to a point 166. A capacitor 168 is provided between point 166 and ground in parallel with either the RF choke or the ferrite coil antenna 162.

Further included in the detector of FIG. 6 are an audio frequency amplifier 170; an operational amplifier 172; and, potentiometers 174 and 176. The audio frequency amplifier 170 and the amplifier 172 are of types bearing part numbers LM 386 and 741, respectively. The output terminal of the amplifier 170 is connected across the potentiometer 174, whose tap is connected to an input terminal of the op amp 172. The output terminal of the op amp 172 is connected in turn across potentiometer 176, whose tap is applied to the protection controller 28 on line 58.

In an alternate example, all the elements of the detector of FIG. 6 (except the antennae 160, 162 and capacitor 168) can have substituted therefor an eight pin amplitude modulated radio receiver circuit known as a Ferranti Integrated Circuit and which bears part number ZN416E.

In either example of the tuned radio frequency receiver detector, the output signal applied on line 58 has an amplitude voltage indicative of atmospheric noise caused for example by lightning, either from cloud-to-ground or cloud-to-cloud. Preferably the radio frequency receiver detector is tuned via filtering to detect noise occurring in a range of from about 30 KHz to about 300 KHz, thereby not being susceptible to transmissions such as man-made transmissions. Preferably the tuned radio frequency receiver detector circuit has as high a "q" value as possible to minimize drift. Such filtering is accomplished by choice of elements such as the capacitor 168, which is not a variable capacitance.

As mentioned above, the detector of FIG. 6 can utilize a ferrite coil antenna 162 (which may provide a listening range of a mile or so) or, in the alternative, an external antenna 160 coupled with a RF choke for providing an extending listening range of many miles.

Figure 3:
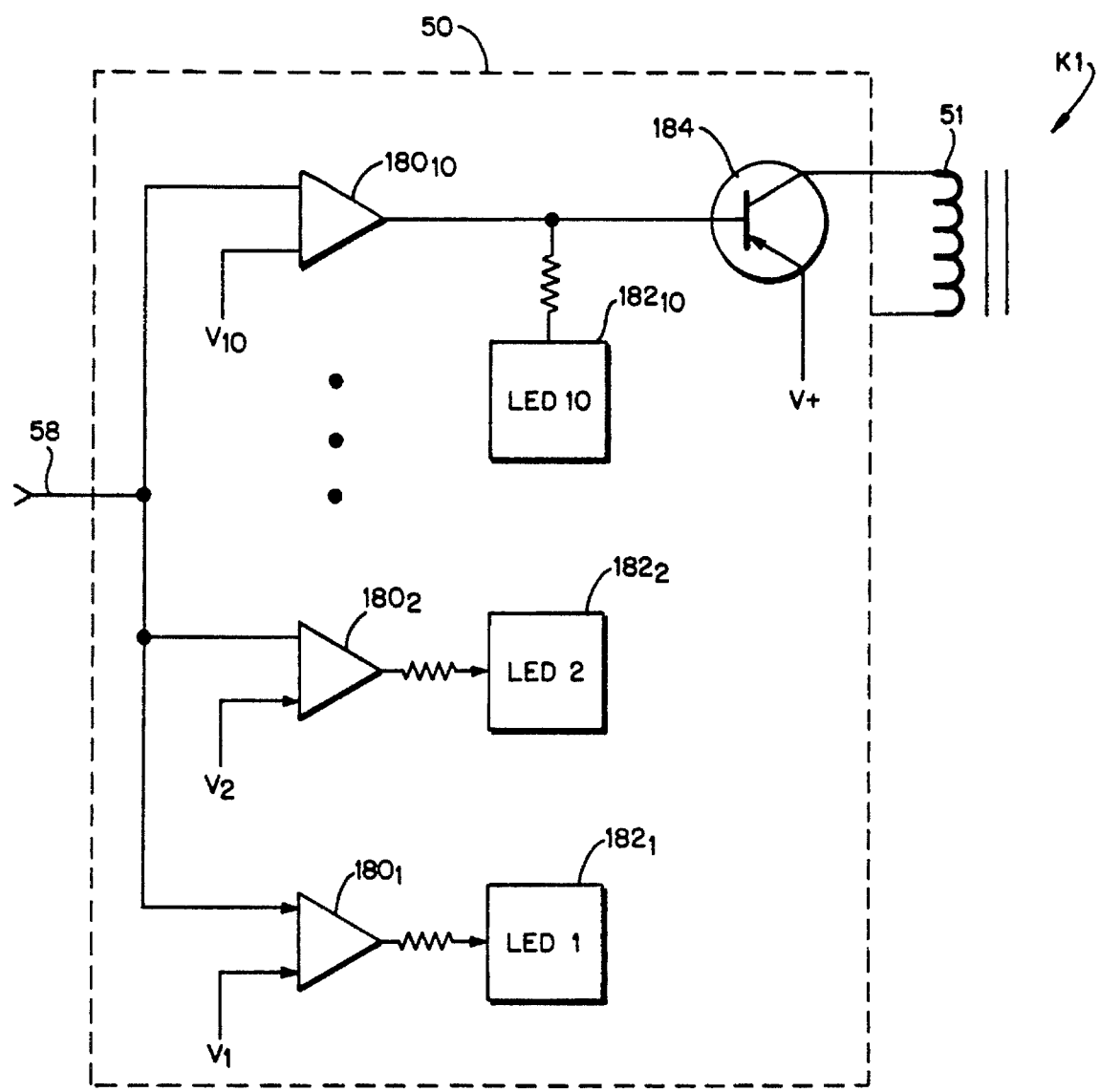
FIG. 3 is a schematic view of a bargraph LED indication/relay driver circuit of the embodiment of FIG. 2.

FIG. 3 illustrates a bargraph LED indicator/relay driver circuit 50 usable with detectors such as those shown in FIGS. 5 and 6. The indicator/relay circuit 50 includes ten comparators (LM 339) $180_1$–$180_{10}$, each comparator 180 having a first input terminal thereof connected to receive the voltage amplitude signal applied on line 58 from the detector 24. Second input terminals of the comparator 180 are connected to a voltage division network whereby each comparator 180 receives a different reference voltage. The reference voltage $V_1$ applied to comparator $180_1$ is less than the reference voltage $V_2$ applied to comparator $180_2$; the reference voltage $V_2$ applied to comparator $180_2$ is less than the reference voltage $V_3$ applied to comparator $180_3$; and so forth with the reference voltage $V_{10}$ applied to comparator $180_{10}$ being the greatest. If the voltage signal applied from the detector 24 on line 58 exceeds the reference voltage for a given detector $180_x$, the comparator $180_x$ outputs a signal to activate an associated LED display $182_x$ connected thereto. Thus, as the signal from the detector 26 rises, different segments of the LEDs 182 are illuminated. Moreover, if the voltage signal applied from the detector 24 on line 58 exceeds the reference voltage for the detector $180_{10}$, the comparator $180_{10}$ outputs a signal to a gate of an amplifier driver 184. The amplifier driver 184 has its emitter connected to the power supply 26 (as denoted by "V+" in all Figures referenced herein) and its collector connected to the coil 51 of the relay K1.

From the foregoing discussion it should be understood that the detector of FIG. 4 connects directly to the relay K1 as shown in FIG. 4 without intermediate connection to the indicator/driver circuit of FIG. 3.

The protection system 220 of the embodiment of FIG. 7 includes many elements of the system 20 of the embodiment of FIG. 1, with the common elements retaining the same reference numerals as shown in FIG. 1. The protection system 220 includes a protection switching circuit 30' which is an augmentation of the circuit 30 of the embodiment of FIG. 1. In addition to the elements previously discussed with reference to FIG. 1, the protection system 220 of the embodiment of FIG. 7 includes a device utilization sensor or monitor 222 and a detector disable circuit 224.

The protection system 220 of FIG. 7 further shows a standard alternating current AC input line 226 having the device utilization sensor 222 installed thereon. When the device utilization sensor 222 determines that the level of current consumed by device $22_N$ indicates that the device $22_N$ is being utilized, the sensor 222 applies a signal to the detector disable circuit 224, whereupon the detector disable circuit 224 disconnects the detector 24 from the power supply 26 and thereby precludes the protection controller 28 from grounding the protected devices 22. On the other hand, if the device utilization sensor 222 does not cause disabling of the detector 26, and if a potential threat of a damaging overvoltage condition is sensed by the detector 26, the protection controller 28 causes the protection switching circuitry 30' to ground or otherwise protect the devices 22 and to ground the AC line 226.

Figure 8:
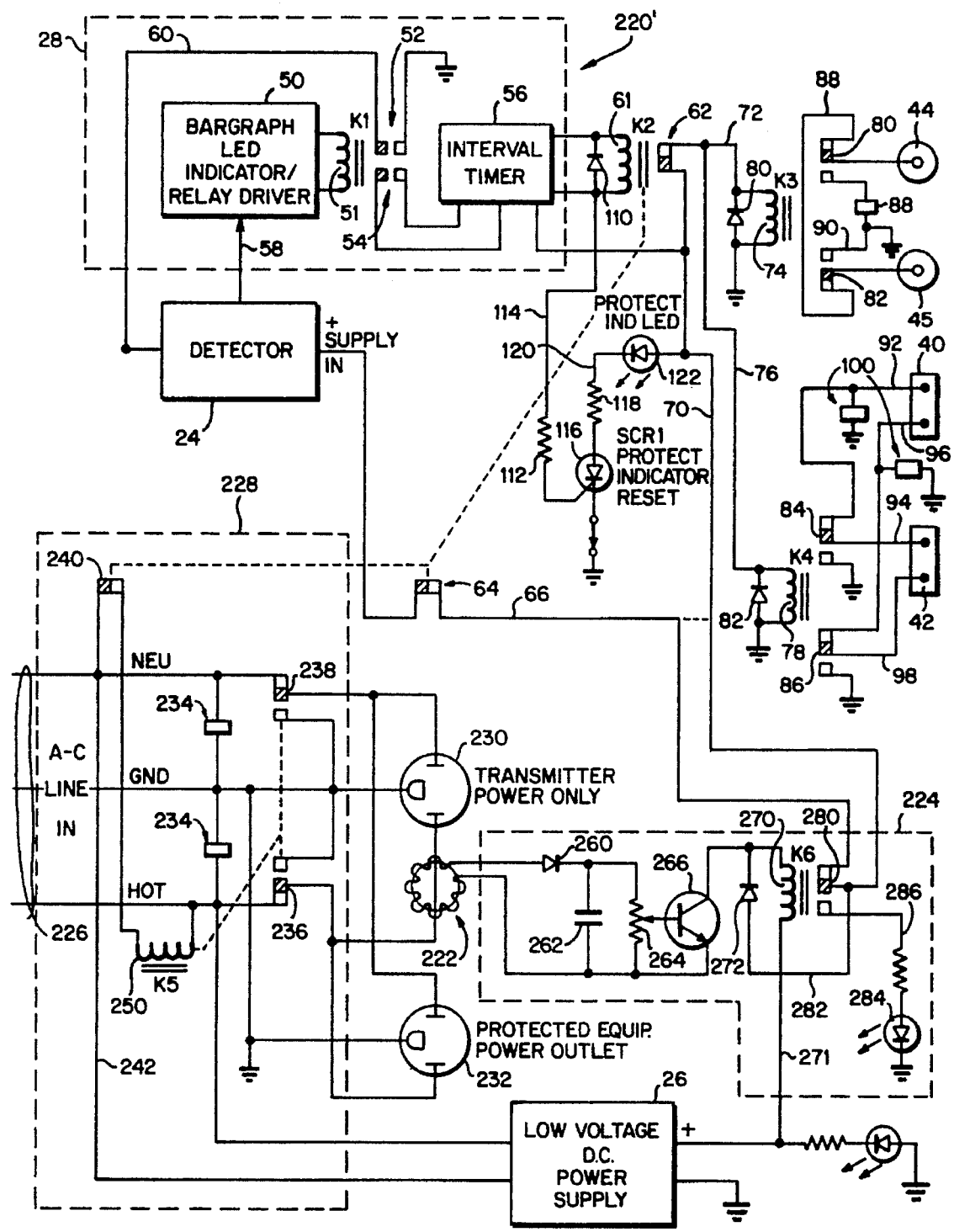
FIG. 8 is a detailed schematic view of an exemplary protection system of the embodiment of FIG. 7.

FIG. 8 shows an example of the protection system 220' of the embodiment of FIG. 7. The protection system 220' includes many elements of the system 20' of FIG. 2, with the common elements retaining the same reference numerals as shown in FIG. 2. In addition to the elements previously discussed with reference to FIG. 2, the protection system 220' of FIG. 8 includes the device utilization sensor 222 and the detector disable circuit 224. Further, FIG. 8 illustrates an AC grounding circuit 228 (which forms part of the protection switching circuit 30'); an AC power outlets 230 and 232 for a protected device.

In FIG. 8 the AC power line 226 is shown as including "hot", "ground", and "neu" ("neutral") wires. Surge suppression devices 234 are connected between the "hot" and "ground" wire and between the "neu" and "ground" wires. Under normal conditions, the "hot", "ground", and "neu" wires of the AC line 226 are connected to respective terminals of the power outlets 230 and 232. In this regard, under normal conditions the "hot" terminals of the power outlets 230 and 232 are connected through a relay contact 236 to the "hot" wire in AC line 226 and the "neu" terminals of the power outlets 230 and 232 are connected through a relay contact 238 to the "neu" wire in AC line 226

The protection switching circuit 30' of FIG. 8 shows relay contacts 240 which, like contacts 62, open upon activation of the master relay K2. Opening of the switch contacts 240 breaks an electrical circuit including line 242 and the power supply 26 and thereby de-energizes coil 250 of relay KS. De-activation of coil 250 of relay K5 causes the relay contacts 236 and 238 to switch, thereby grounding the power outlets 130 and 232 and the protected devices plugged therein.

The device utilization detector 222 shown in FIG. 8 comprises a current sense toroid transformer which is connected on the "hot" wire to the AC power outlet 230. Connected across the current sense transformer 222 in the detector disable circuit 224 is a diode 260 in series with a parallel combination of a capacitor 262 and a potentiometer 264. The tap of the potentiometer 264 is applied to the gate of amplifier driver 266. The collector of the amplifier driver 266 is connected to a first end of a coil 270 of a relay K6. A second end of the coil 270 is connected via line 271 to the power supply 26. A diode 272 is connected between the ends of the coil 270 of relay K6.

As shown in FIG. 8, a relay contact 280 is responsive to the relay K6. When a device, such as a radio frequency transmitter, plugged into the AC power outlet 230 is not operating, the relay contact 280 is in the position shown in FIG. 8 for connecting the detector 24 via line 66 to a line 282 (and ultimately via line 271 to the power supply 26). However, when the device plugged into AC power outlet 230 draws sufficient current (as sensed by the sensor 222), the detector disable circuit 224 activates the relay K6 to cause the contact 280 to switch, whereby the contact 280 breaks the connection between line 66 and the power supply 26 and instead completes a circuit between the power supply 26 and a detector disable LED 284 situated on line 286.

The operation of all of the preceding embodiments will be understood from the following description of the operation of the system 220' of FIG. 8 as augmented by the foregoing discussions. During normal operation, the antenna-utilizing device has its antenna connected to its antenna input terminal through a circuit including contacts 80 and 82 and line 88. Similarly, the telephone line-utilizing device is connected to the two telephone input wires 92 and 94 through the contacts 84 and 86. Other protected equipment is plugged into the AC power outlet 232 and special equipment, such as an radio frequency transmitter, is plugged into the AC power outlet 230.

As long as the radio frequency transmitter plugged into AC power outlet 230 is not operating, the overvoltage detector 24 receives power from the power supply 26. In this regard, DC power is supplied to the detector 24 as relay contact 280 completes the circuit (including lines 271, 282, and 66) between the power supply 26 and the detector 24. The point of application of power to the detector 24 is understood with reference to the labeling of line 66 and to the notation "V+" employed throughout the drawings.

While the detector 24 is receiving power, the detector 24 detects atmospheric disturbances which attend an approaching storm or lightning. For example, the detectors of FIGS. 4 and 5 detect changes in ionization in the atmosphere resulting from an on-coming storm and generate a voltage signal having a magnitude indicative of the ionization change. The detector of FIG. 6 essentially "listens" to atmospheric disturbances and generates a voltage signal indicative of the atmospheric noise caused by lightning (either from cloud-to-cloud or cloud-to-ground) or other atmospheric noise.

When using the display/driver circuit of FIG. 3, the magnitude of the signal generated by the detector 24 is applied and indicated by the illumination of different segments of the LEDs 182. Moreover, if the voltage signal applied from the detector 24 on line 58 exceeds the predetermined reference voltage applied to comparator $180_{10}$, the coil 51 of relay K1 is activated.

Activation of the relay K1 has two consequences. First, the interval timer 56 is energized by the closing of contacts 54. Second, the detector 24 is protected from the potential threat of an overvoltage situation by application of a grounding signal on line 60 as contacts 52 are closed. In connection with this later consequence, the atmospheric sensors 120 and 140 of the embodiments of FIGS. 4 and 5, respectively, and the antennae 160/162 of the embodiment of FIG. 6, are each grounded.

Energization of the interval timer 56 involves application of a start signal to the timer 56. Upon receipt of the start signal, the timer 56 outputs, for a predetermined and programmable time interval, an output signal which activates the coil 61 of the master relay K2. Preferably, the duration of the time interval for which the coil 61 is activated is in the range of from about 5 minutes to about 15 minutes. In one embodiment, the interval timer 56 is programmable (selectively variable) so that the time interval is 10 minutes during one mode (e.g., while the user is on the premises) and 30 minutes in another mode (e.g., while the user is absent from the premises).

Activation of the coil 61 of the master relay K2 causes the opening of the contacts 62, 64, and 240 in the manner hereinbefore described. The opening of contacts 62 in turn causes the de-activation of relays K3 and K4 for the grounding of the antenna-utilizing device and the telephone line-utilization device, respectively. The opening of contacts 240 grounds the AC power outlets 230 and 232, thereby protecting the devices plugged therein.

After the time interval programmed into the timer 56 has elapsed, the timer 56 de-activates the coil 61 of the relay K2. As will be understood from the foregoing discussion, de-activation of the coil 61 of the master relay K2 removes the grounding of the protected devices. However, should the detector 24 again detect a potential threat of a perilous condition, the relay K2 is subject to automatic reactivation in the same manner as the original activation. Thus, activation and de-activation of the master relay K2 will continue automatically in accordance with the sensed conditions.

As described above, if the device plugged into the AC power outlet 230 is operating (i.e., drawing sufficient current as determined by sensor 222), that device is not shut down during operation (e.g., not grounded). This is particularly advantageous when the protected device is a radio transmitter and it is desirable that communications such as transmitting should be continued despite an impending storm.

Whether a device is drawing sufficient current to preclude shut-down is determined in conjunction with the setting of the potentiometer 264 included in the detection disable circuit 224. Adjustment of the potentiometer 264 facilitates discrimination between disablement of the detector 24 during a transmit mode or a receive mode of an RF communications unit, for example.

The provision of the device utilization sensor 222 is particularly advantageous when protecting an RF transmitting device and when the detector of FIG. 6 is employed in the protection system. In this regard, the device utilization sensor 222 coupled with the detector disable circuit 224 precludes the protected device from falsely triggering the detector of FIG. 6.

Figure 9:
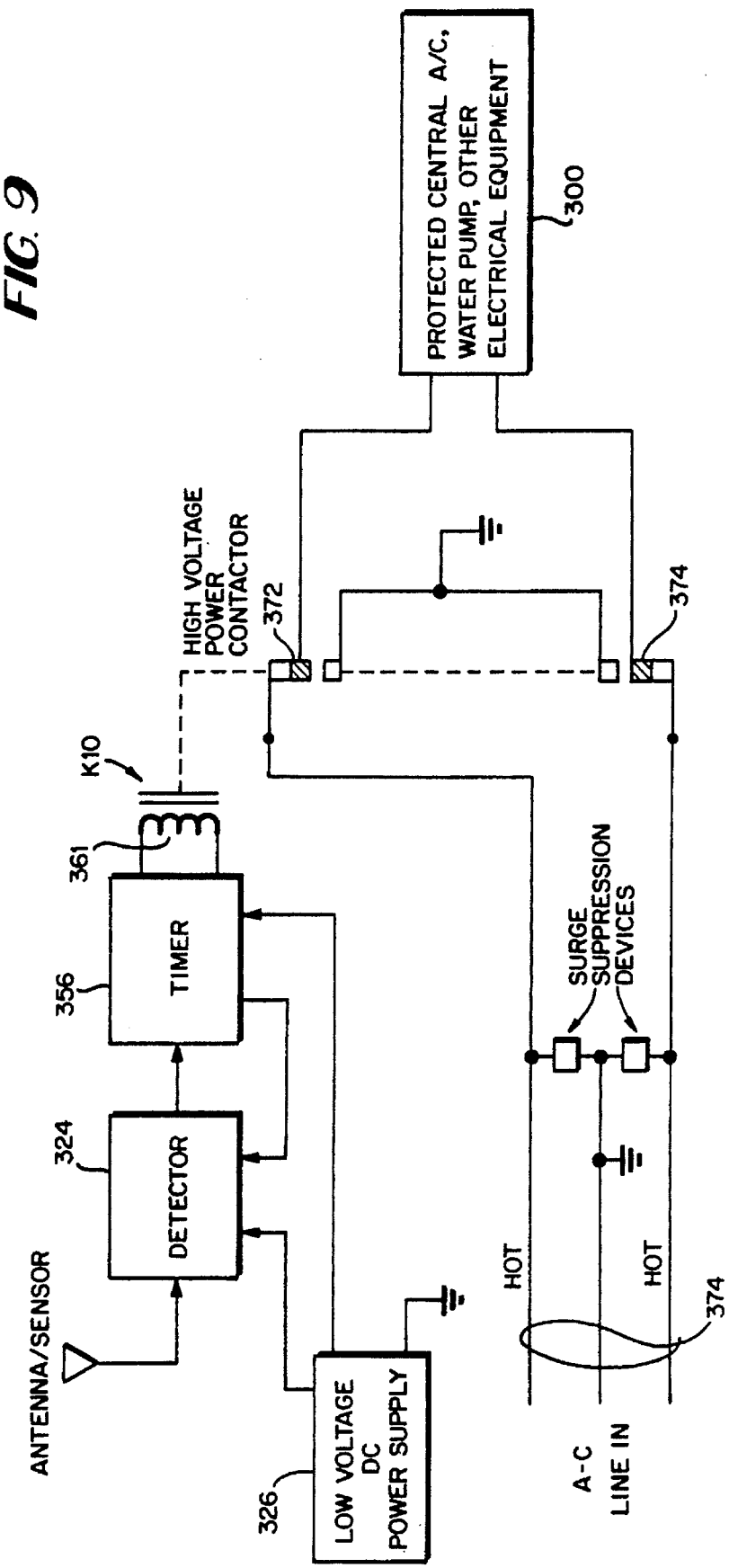
FIG. 9 is schematic view of a protection system according to another embodiment of the invention.

FIG. 9 illustrates another embodiment providing protection for an electrical device 300. The embodiment of FIG. 9 includes a detector 324. The detector 324 is powered by power supply 326, as is an interval timer 356. The detector 324 is connected directly to the interval timer 356. An output of the interval timer 356 is connected to a coil 361 of a relay K10 for activating the coil 361 when a potential threat of an overvoltage situation is sensed by the detector 324. When the relay K10 is not activated, the protected device 300 is connected via relay contacts 370 and 372 to the AC line 374. However, when the relay K10 is activated, the contacts 372 and 374 switch so as to ground the protected device 300.

The bargraph indicator 50 advantageously provides a segmented display, with the number of display elements 182 illuminated at any time being related to the magnitude of the phenomena sensed by protection system 20. Protection system 220' of FIG. 8 can also advantageously be employed to display (on bargraph indicator 50) any AC line surges occurring on AC line 226. In such case, the antenna of system 220' can either be disconnected (for segmented display of AC line surges only) or remain installed (for segmented display of both AC line surges and electrical fields picked up by the antenna).

In the above regard, FIG. 8 illustrates that DC power supply 26 which powers protection system 220' is connected in such a manner to receive transient signals resulting from line signals on an AC power line. As shown in FIG. 8, DC power supply 26 receives the AC transients through current sense toroid transformer 222 and relay K6, and in addition receives AC transients through the negative side connection of power supply 26 to AC line 226. Even absent the connection via sensor 222, connection of DC power supply 26 to AC line 226 as shown in FIG. 8 permits enough transient pick-up for illustration of line surges on the segmented display of bargraph 50. The magnitude of the voltage surges are illustrated on bargraph 50 in relation to the number of display elements 182 which are activated.

Moreover, in equipment protection system 220' of the embodiment of FIG. 8, relay contacts 236 and 238 connects or shunts together and to ground all lines ("hot", "neu", and "ground") of AC line 26. Such shunting precludes any arcing to the protected equipment.

While the invention has been particularly shown and described with reference to the preferred embodiments thereof, it will be understood by those skilled in the art that various alterations in form and detail may be made therein without departing from the spirit and scope of the invention. For example, it should be understood that the protected device plugged into the AC power outlet 230, the utilization of which is monitored, need not be limited to the aforedescribed example of a radio transmitter. Moreover, the protected devices described herein are merely illustrative, it being understood that other types of devices are similarly protectible.

The embodiments of the invention in which an exclusive property or privilege is claimed are defined as follows:

1. An apparatus for monitoring voltage levels, the apparatus comprising:
   a DC power supply which supplies power to an equipment voltage protection system, the DC power supply being connected to receive transient signals resulting form line signals on an AC power line; and
   an indicator connected to the DC power supply, and wherein the transient signals are utilized to display line surges occurring on the AC power line on the indicator, said indicator comprising a visual indicator including a plurality of display segments and wherein the number of segments illuminated at any time is related to the magnitude of the line surges occurring on the AC power line.

2. The apparatus of claim 1, wherein the equipment voltage protection system includes a detector which detects changes in an electrical field indicating the incipient presence of a potentially damaging electric field level.

3. The apparatus of claim 1, wherein the indicator is a bargraph indicator.

4. The apparatus of claim 1, wherein the DC power supply is connected to an AC line sensor.

5. The apparatus of claim 4, wherein the AC line sensor is a current sensor.

6. The apparatus of claim 4, wherein the AC line sensor is connected through a switch to the DC power supply, a first terminal of the switch being connected to the DC power supply and a second terminal of the switch being connected to the indicator.

7. The apparatus of claim 6, wherein a third terminal of the switch is connected to electrical ground.

8. An apparatus for monitoring voltage levels, the apparatus comprising:
   a detector for detecting changes in an electrical field indicating the incipient presence of a potentially damaging electrical field level; and
   a visual indicator having a plurality of display segments, and wherein the number of segments illuminated at any time is related to the magnitude of the detected changes in the electrical field.

9. The apparatus of claim 8, wherein the indicator is a bargraph indicator.

10. The apparatus of claim 8, further comprising:
    a DC power supply which supplies power to the detector and is connected to receive transient signals resulting from line signals on an AC power line and to apply the transient signals to the detector; and
    wherein the transient signals are utilized to display line surges occurring on the AC power line on the visual indicator.

11. The apparatus of claim 10, wherein the DC power supply is connected to an AC line sensor.

12. The apparatus of claim 11, wherein the AC line sensor is a current sensor.

13. The apparatus of claim 10, wherein the AC line sensor is connected through a switch coil to the DC power supply, a first terminal of the switch being connected to the DC power supply and a second terminal of the switch being connected to the detector.

14. The apparatus of claim 13, wherein a third terminal of the switch is connected to electrical ground.

15. An apparatus for monitoring voltage levels, the apparatus comprising:
    a detector for detecting changes in an electrical field indicating the incipient presence of a potentially damaging electrical field level;
    a DC power supply which supplies power to the detector and is connected to receive transient signals resulting from line signals on an AC power line and to apply the transient signals to the detector;
    an indicator which provides an indication related to the magnitude of changes in the electrical field; and
    wherein the transient signals are utilized to also display line surges occurring on the AC power line on the indicator.

16. The apparatus of claim 15, wherein the indicator is a visual indicator having a plurality of display segments, and wherein the number of segments illuminated at any time is related to the magnitude of the detected changes in the electrical field and/or the line surges occurring on the AC power line.

17. The apparatus of claim 15, wherein the indicator is a bargraph indicator.

18. The apparatus of claim 15, wherein the DC power supply is connected to an AC line sensor.

19. The apparatus of claim 18, wherein the AC line sensor is a current sensor.

20. The apparatus of claim 18, wherein the AC line sensor is connected through a switch to the DC power supply; wherein a first terminal of the switch is connected to the DC power supply and a second terminal of the switch is connected to the detector.

21. The apparatus of claim 20, wherein a third terminal of the switch is connected to electrical ground.

* * * * *